United States Patent
Edwards

[11] 3,877,245
[45] Apr. 15, 1975

[54] AIR CONDITIONER HAVING TEMPERING AND MOISTURE CONTROL MEANS

[75] Inventor: Thomas C. Edwards, Casselberry, Fla.

[73] Assignee: The Rovac Corporation, Maitland, Fla.

[22] Filed: Nov. 30, 1973

[21] Appl. No.: 420,712

[52] U.S. Cl. .................. 62/317; 62/93; 62/272; 62/275; 62/402
[51] Int. Cl. ............................................. F25d 17/04
[58] Field of Search ........ 62/272, 275, 402, 93, 317

[56] References Cited
UNITED STATES PATENTS

| | | | |
|---|---|---|---|
| 2,809,714 | 10/1957 | Sims | 62/402 |
| 2,835,340 | 5/1958 | McGuff | 62/93 |
| 2,943,460 | 7/1960 | Brown | 62/150 |
| 2,997,131 | 8/1961 | Fisher | 62/275 |
| 3,012,413 | 12/1961 | Anderson | 62/402 |

Primary Examiner—William J. Wye
Attorney, Agent, or Firm—Wolfe, Hubbard, Leydig, Voit & Osann, Ltd.

[57] ABSTRACT

An air conditioning system based upon use of a vane type compressor-expander and which includes means for tempering and drying the air discharged into the conditioned space as well as reducing any noise caused by the vanes. The air containing ice particles is conducted into a filter formed of porous, thermally conductive material, preferably sintered metal. The filter is thermally coupled to the ambient air so that it is maintained above freezing temperatures so that ice particles entrapped by the filter are converted into liquid moisture which is drained away. The discharge surface of the filter element is, in one embodiment of the invention, subjected to a flow of ambient air which not only warms the filter element but which mixes with the cold air being discharged therefrom to form a tempered air mix which is vented into the space. In another embodiment of the invention the filter is thermally coupled to the ambient by means of conductive fins. Flow of ambient air for tempering purposes is induced by an auxiliary fan, but in one embodiment of the invention the compressor-expander is provided with inlet and outlet conduits which are adjacent to one another with a filter in the outlet conduit which is thermally coupled to ambient air flowing through the inlet conduit and with provision for adjusting a degree of coupling.

17 Claims, 11 Drawing Figures

PATENTED APR 15 1975
3,877,245
SHEET 1 OF 4

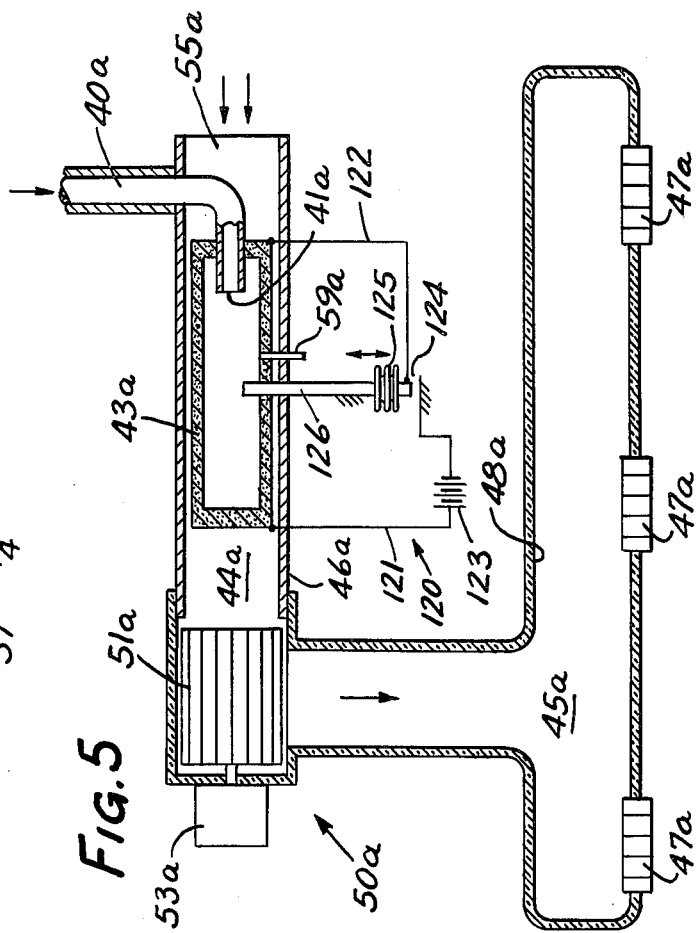
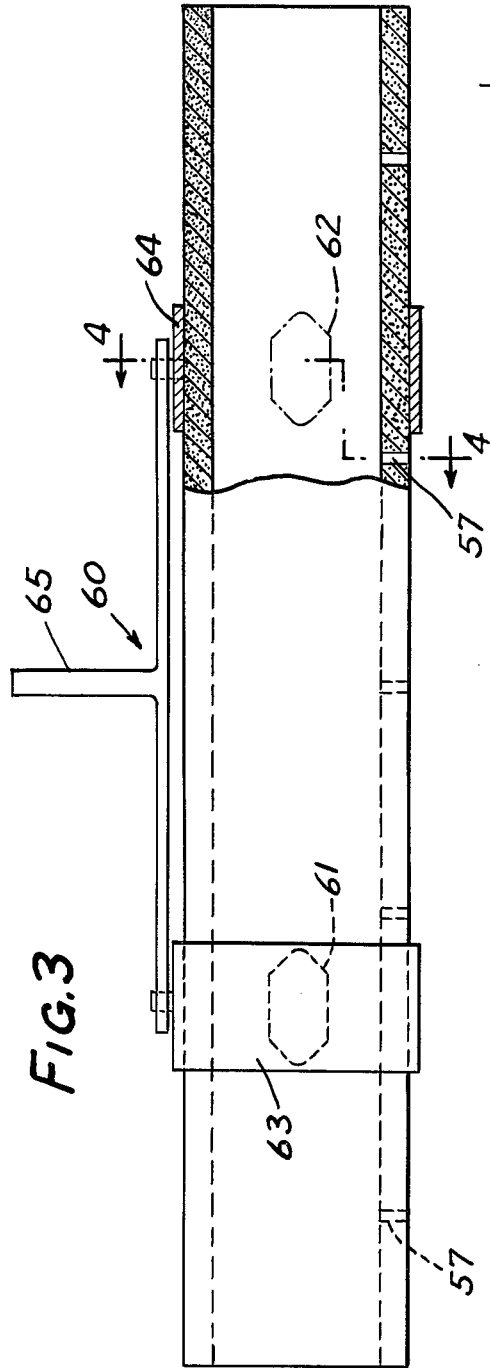
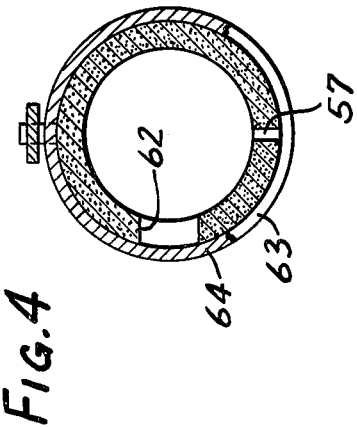

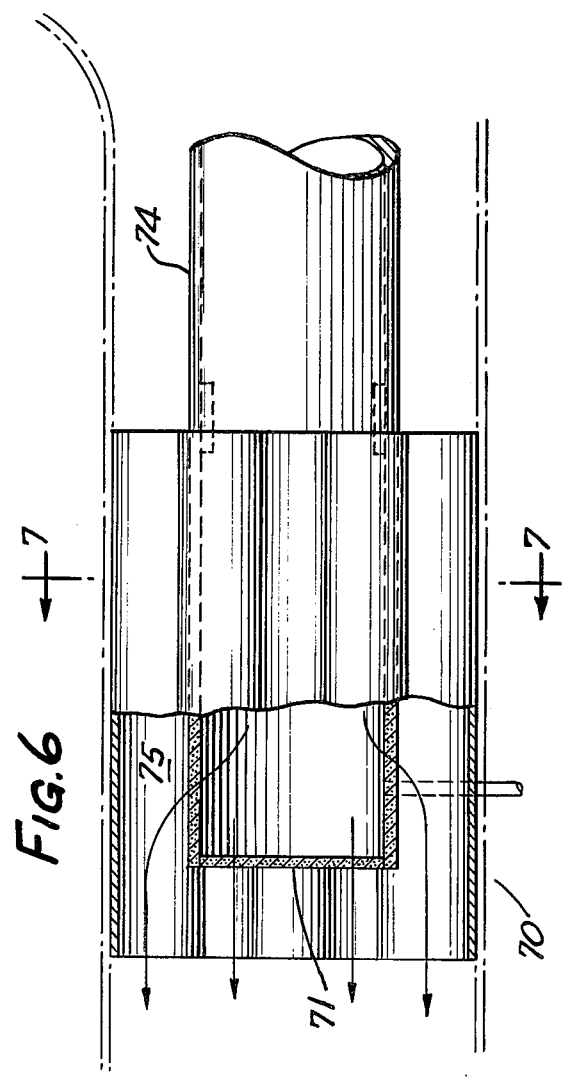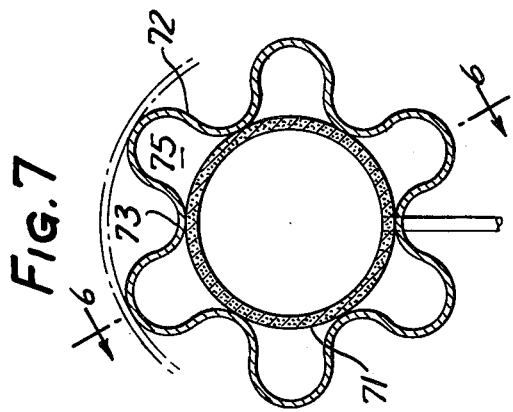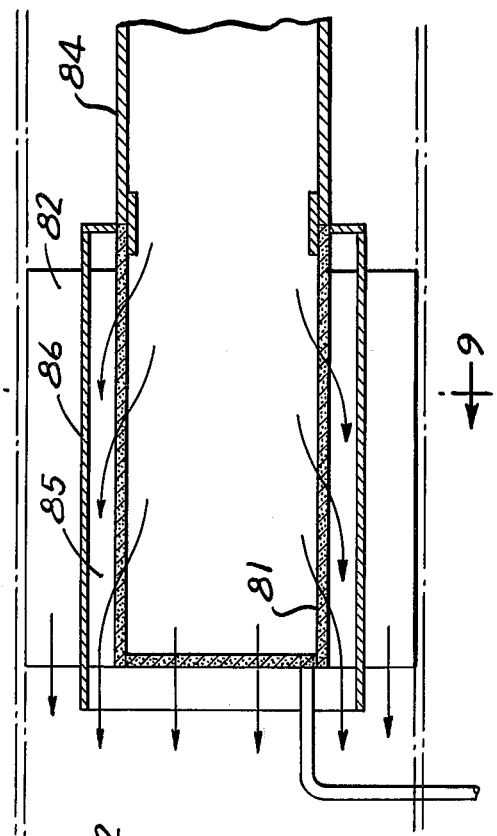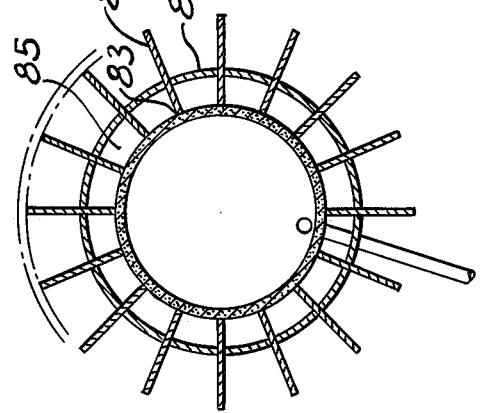

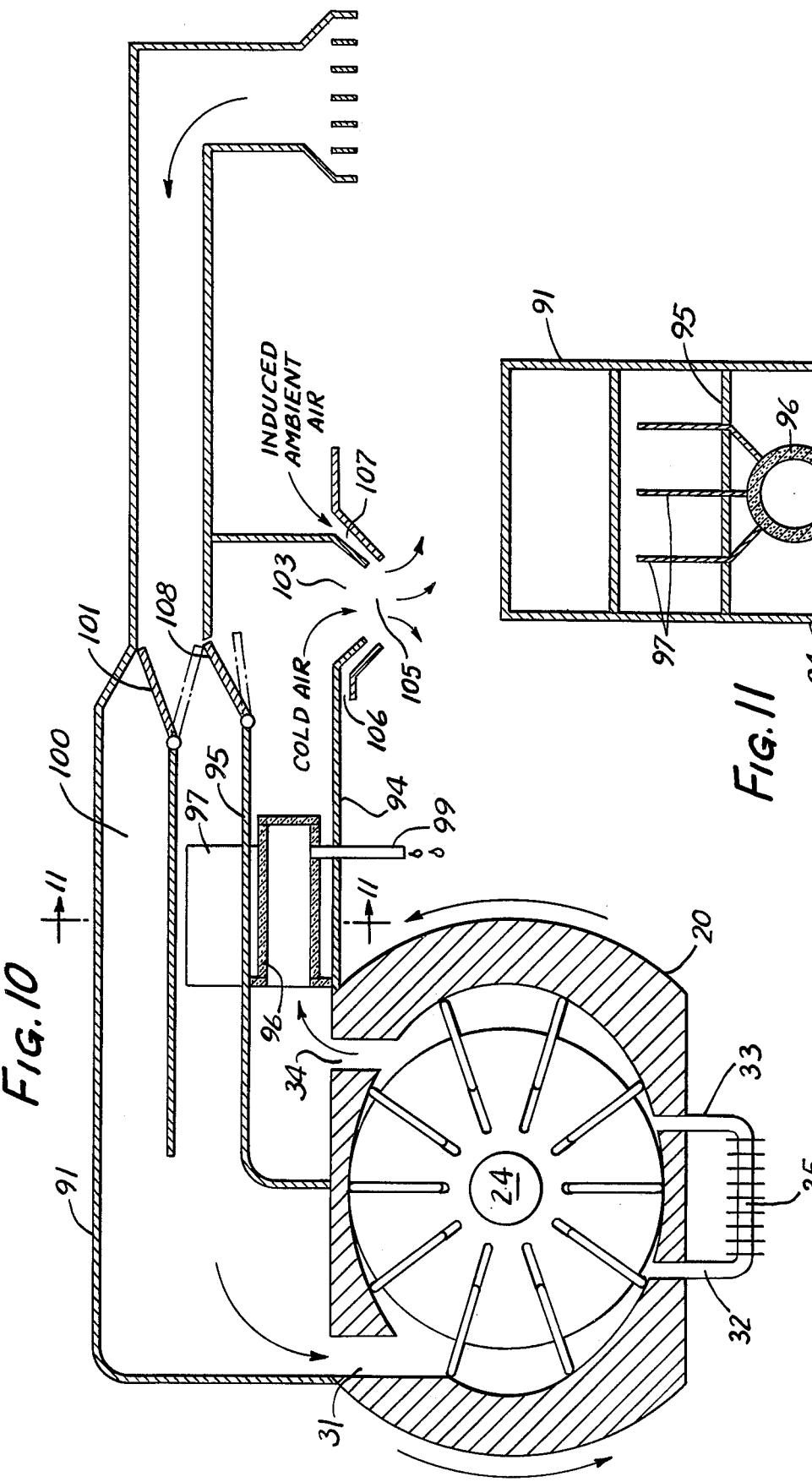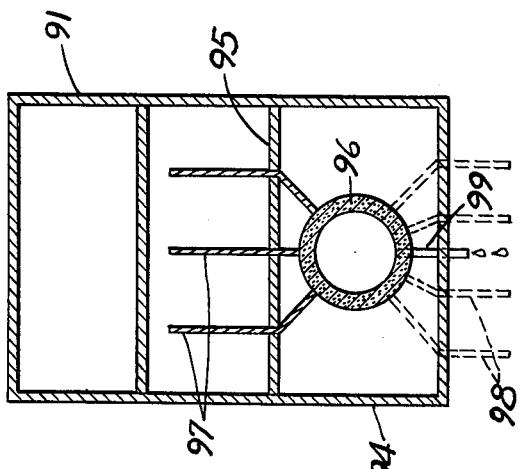

AIR CONDITIONER HAVING TEMPERING AND MOISTURE CONTROL MEANS

In my prior U.S. Pat. No. 3,686,893, a compressor-expander is disclosed having a single vaned rotor which is capable of converting warm ambient air into supercooled air substantially below the freezing point in a tiny fraction of a second. It is an object of the present invention to provide means for removing the ice particles from the supercooled air and for mixing it in desired proportion with ambient air to provide a tempered mix of cool dry air for discharging into the conditioned space.

It is another object of the present invention to provide a simple and inexpensive moisture and temperature controlling arrangement for a compressor-expander which enables the latter to operate at high efficiency but which dehumidifies the discharged air and tempers it for discharge at a moderate, comfortable conditioning temperature. It is a related object to provide means for removing ice particles from the supercooled air but which avoids any risk of clogging or freeze-up of the filter, for example under humid, low ambient conditions. Finally it is an object of the present invention to provide a simple and effective air conditioner "package" which may be employed wherever cool relatively dry air is required and which is particularly well suited for use in automobiles, refrigerator cars, or other confined spaces.

Other objects and advantages of the invention become apparent upon reading the attached detailed description and upon reference to the drawings in which:

FIG. 3 shows a filter element of the type employed in FIG. 1 and 2 but having provision for humidity control;

FIG. 4 is a transverse section of the filter looking along line 4—4 in FIG. 3;

FIG. 5 is a planned view similar to FIG. 1 but showing a modified form of the invention;

FIG. 6 is an elevation view, in partial section, of a filter assembly looking along line 6—6 in FIG. 7;

FIG. 7 is a transaxial view looking along line 7—7 in FIG. 6;

FIG. 8 is a view similar to FIG. 7 but showing a modified form of filter assembly;

FIG. 9 is a transverse section looking along the line 9—9 of FIG. 8;

FIG. 10 shows a further modification of the invention utilizing adjacent inlet and outlet conduits.

FIG. 11 is a cross sectional view taken along line 11—11 in FIG. 10

While the invention has been described for certain preferred embodiments, it will be understood that I do not intend to be limited to the particular embodiments shown but intend, on the contrary, to accompany the various alternative and the equivalent constructions included in the spirit and scope of the appended claims.

Figure 1:
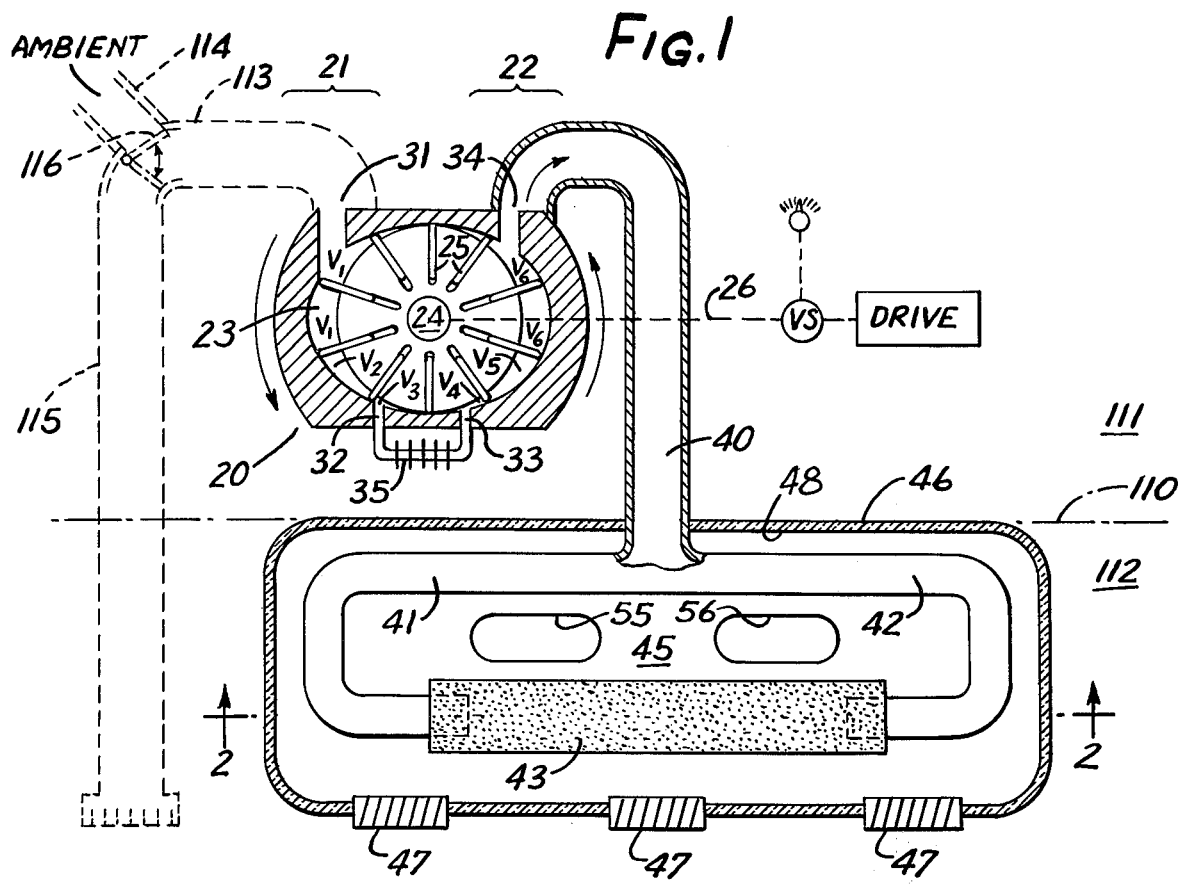
FIG. 1 is a diagram showing a typical compressor-expander and discharge plenum assembly looking along line 1—1 in FIG. 2.
Figure 2:
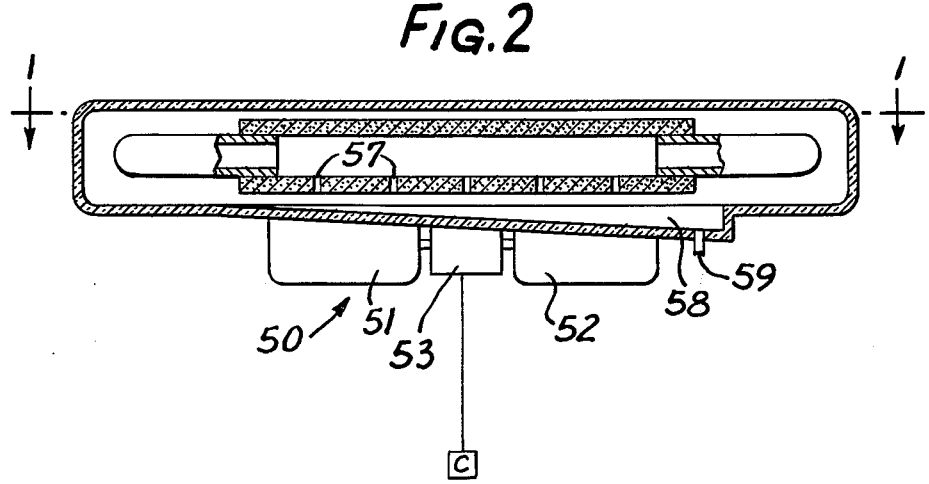
FIG. 2 is a vertical section looking along the line 2—2 in FIG. 1.

Turning now to the drawings, in particular to FIGS. 1 and 2, there is shown, in cross section, a compressor-expander 20 having a compressor side 21 and an expander side 22. For a detailed description of a compressor-expander, reference is made to the above-mentioned patent. It will suffice to say that the device includes an oval chamber 23 in which rotates a rotor 24 having a series of radial vanes 25, the rotor being drive by any suitable driving connection 26 which might, for example, be a belt coupled to an automobile engine or, indeed, an electric motor. On the compressor side there is an inlet port 31 and an outlet port 32, while on the expander side there is an inlet port 33 and an outlet port 34. Interposed between the ports 32, 33 is a heat exchanger 35. In operation, with the rotor being turned in the counterclockwise direction as shown, air is drawn into the inlet port 31 and is progressively compressed from a volume $V_1$ to a volume $V_3$ for discharge at an elevated pressure and temperature into the heat exchanger 35 where the temperature is reduced to near the ambient level while keeping the pressure the same. Following passage through the heat exchanger the air is discharged into the expansion side where the air expands in volume $V_4$-$V_6$ and suffers a drop in both pressure and temperature. Thus the air which is discharged at the outlet port 34, while at ambient (atmospheric) pressure, is at a temperature which is far below ambient and which in the normal case is a number of degrees below freezing so that the air contains the original moisture in the form of entrained small particles of ice.

In accordance with the present invention, the outlet port of the compressor-expander is connected by a conduit to a filter element having a wall made of porous thermally conductive material for removing from the air stream any particles of ice, with means being provided for artificially warming the filter element to insure that the pores do not become clogged with ice and for mixing with the cold air discharged from the filter element a certain proportion of ambient air so that the air discharged into the conditioned space is relatively dry and at a comfortable temperature above the freezing point. Referring more specifically to FIGS. 1 and 2, the outlet port 34 is connected by a conduit 40 having branches 41, 42 to a filtering element 43. The filtering element is preferably in the form of a rigid cylinder of porous metal having pores within the range of 0.5 to 1,000 microns. For automotive use the filter element 43 may have a diameter within the range of one to 4 inches and a length within the range of 3 to 20 inches. Sintered metal is preferred, for example that made by Bendix Corporation and commercially available under the name of POROPLATE.

In carrying out the invention the filter element is mounted within a plenum 45 defined by a housing 46 having vents 47, with means being provided for inducing flow of ambient air into the housing for warming of the filter so that it cannot become clogged with ice particles and for mixing with the air emanating from the outer surface of the filter so that the air which is discharged through the vents 47 is at a tempered, more comfortable temperature typically within the range of 40° to 68° F. For inducing flow of ambient air into the plenum, a blower assembly 50 is provided consisting of blowers 51, 52 of the squirrel cage type driven by a centrally mounted electric motor 53. The air from the blowers entering through inlet openings 55, 56, respectively.

The ambient air inlet openings 55, 56 are preferably placed immediately adjacent the surface of the filtering element so that the ambient air, or a mixture thereof, scrubs the surface of the filter imparting heat which is conductively transmitted to the interior of the element through the porous metal to melt any ice particles which may have deposited upon the inside wall. The resulting moisture collects inside the bottom of the filter element and drains through the filter element via drain holes 57 into a trough 58 having a discharge spout 59 which may be connected to a suitable drain hose. While the motor 53 may be of the conventional type, it preferably has a control C for adjusting its speed thereby to determine the amount of ambient air, per minute, which is brough into the plenum. This in turn controls the temperature of the tempered air which is discharged at the vent 47. As a further mode of control, a variable speed coupling VS (FIG. 1) may be interposed between the drive source and the drive connection 26.

It may be noted that the system is self-protecting. While sufficient heat will be transmitted to the filter element to melt all of the ice particles under normal conditions, it is conceivable that under cool, moist ambient conditions the amount of ice which is deposited in the filter may exceed the melting capability so as to produce a condition of temporary or incipient blockage. Where this condition occurs, the effect is to increase the back pressure upon the compressor-expander which tends to shift the temperature of the air produced by the compressor-expander above the freezing point so that ice is no longer produced and with the warmer air serving, in addition, to assist in melting any ice which may have accumulated in the filter. This in turn relieves the back pressure to restore normal operation.

It might be thought that, using a filter material having pores on the order of 0.5 to 1,000 microns the viscosity of liquid moisture would be such as to bridge the openings so as to produce a blocking condition. Such, however, has been found not to be the case. Indeed, using a filter element such as that described, very little back pressure is produced even though the inner wall of the filter element is thoroughly wetted by moisture from the melted ice. The pores are, however, sufficiently fine so that the accumulated water tends to pass through the drain holes rather than through the wall of the filter, assisted by the slight back pressure.

It may also be noted that while it is contemplated that the compressor-expander will operate normally at an output temperature which involves entrainment of ice in the air stream to facilitate entrapment of moisture, the latter is not essential to the invention and the device may be designed to operate above the freezing point of water. It is found that the described filter element is capable of removing particles of liquid water almost as effectively as particles of ice of the same microscopic size.

For air conditioning purposes it is normally desired that the air which is discharged from the vents 47 be quite dry, that is, with as much as possible of the water removed. However, it is one of the more detailed features of the present invention that the air may be bypassed around the filter and discharged into the plenum, in minor proportion, in the moisture-laden state. For this purpose, an adjustable opening may be provided in one of the branches of the inlet conduit. It is preferred, however, to utilize a special moisture control 60 (FIGS. 3 and 4) utilizing opening 61, 62, formed in the wall of the filter element and which openings are adjustably covered by slidable collars 63, 64. The collars are interconnected by a control yoke 65 which may be moved manually endwise, or by humidity responsive means, between the illustrated closed position and a displaced position in which the openings 61, 62 are at least partially uncovered.

FIG. 5 illustrates a modified form of the invention in which the filter element is fed from only one of its ends. In this figure, where corresponding reference numerals are used with a subscript $a$, the conduit 40$a$ leading from the compressor-expander has a nipple 41a which is fed into one end of a cylindrically shaped porous filter element 43$a$. The filter element is mounted within a plenum having two portions 44$a$, 45$a$ defined by a housing 46$a$ having discharge vents 47$a$. The flow of ambient air is induced by a blower assembly 50$a$ having a blower element 51$a$ driven by a motor 53$a$. Ambient air is drawn, by induction, through an inlet opening 55$a$ at the right-hand side of FIG. 5 passing closely adjacent the walls of the filter element to warm the latter, with intimate mixture of the cold and ambient air in predetermined proportion so that air at a comfortable temperature is discharged from the vent. Moisture is discharged from the filter element through a drain line 59$a$.

It is one of the features of the assemblies just described that the porous filtering elements tend to reduce to a minimum the air pulsations resulting from passage of the rotor vanes past the outlet 34 of the compressor-expander at sonic frequency. To still further reduce to a barely perceptible level, the plenum chambers 46, 46$a$ are preferably lined with insulation as indicated at 48, 48$a$ respectively. It is found that the type of insulation used is not particularly critical so that any conventional insulation such as thin waterproof batts of glass fiber may be employed as a matter of designer's choice.

In the two embodiments of the invention thus far described heat is transferred from the ambient air into the thermally conductive filter element by direct scrubbing action. However, it is one of the aspects of the present invention that the amount of transferred heat may be increased by providing the filter elements with radially extending fins which are in thermal engagement with the wall of the filter and which extend outward for coupling to the ambient air. FIGS. 6 and 7 show a filter assembly 70, which may be substituted for the filter 43$a$ in FIG. 5, which includes a cylindrical enclosure 71 of porous metal encircled by a unitary corrugated fin assembly 72, with the valleys 73 of the latter being in good thermal contact with the sintered elements. The supercooled air admitted through a conduit 74 flows through the wall of the filter and into the longitudinal ducts 75 defined by the fin assembly. The ambient air, in contact with the outer wall of the fin assembly 72, heats the fin assembly, which heat is thermally conducted to the inner wall of the filter for ice melting purposes. The cold dry air emanating from the channel 75 is then mixed with the ambient air by reason of blower turbulence prior to discharge of the mix through the vent openings.

A still further arrangement is shown at 80 in FIGS. 8 and 9 in which the filter element 81 is provided with radially extending fins 82 thermally connected to the filter element at 83. Cold air, containing ice or moisture, is led in by a conduit 84 through longitudinal ducts 85 defined by a cylindrical wall 86. Incoming ambient air is directed in contact with the fins outside of the cylindrical wall 86 with the heat therefrom being conducted radially inward toward the filter element.

It is part of the present invention, in one of its aspects, to provide conduits connected to the inlet and outlet openings of the compressor-expander and which are arranged closely side by side, a filter element being interposed in the outlet conduit for the purpose of trapping ice particles and with a conductive element or fin extending from the filter into the inlet conduit to pick up heat from the inlet ambient air, thereby making it unnecessary to employ any auxiliary fan or blower. Thus, referring to FIGS. 10 and 11, there is, connected to the inlet port 31, an inlet conduit 91. An outlet conduit 94 is similarly connected to the outlet port 34, the two conduits being side by side with a wall 95 between them. Interposed in the outlet conduit 94 is a filter element 96 which may be of cylindrical shape, enclosed at the remote end, and similar to that shown in FIG. 5. To achieve thermal coupling with the incoming ambient air, the filter 96 is provided with radially extended fins 97 which may project through the wall 95 and into the incoming air streams. If still further filter heating effect is desired, a second set of fins 98 may project through the opposite wall of the conduit 94 into the ambient space as shown in FIG. 11. With the temperature of the filtering element above the freezing point, the collected ice is converted to liquid moisture which may be drained through a drain line 99.

For the purpose of varying the heating effect, a bypass 100 may be provided in the inlet conduit with the proportion of the bypassed air being under the control of a vane or damper 101. It will be apparent that with the vane 101 in the position shown, all of the incoming air will be directed into contact with the fins 97, whereas with the vane in its alternate position very little heat will be transmitted from the vanes 97 to the filter element.

For the purpose of tempering the air, a special discharge vent 105 is provided having provisions for inducing, into the air stream, a certain proportion of ambient air. Such ambient air flows through induction openings 106, 107 so that the mix is discharged in a cool, dry and comfortable state.

If further desired for control purposes, a variable bypass may be provided between the inlet conduit 91 and the outlet conduit 94. This may be done by the simple expedient providing an adjustable vane 108. The effect of cracking the vane open into the dotted position is to provide a localized circulation loop which will tend to reduce the difference between the inlet and outlet temperature of the compressor-expander thereby to reduce the temperature of the air discharged at the vent 105.

In the above discussion it has been assumed that the compressor-expander 20 takes in air from the space in which it is mounted. In practice, the compressor-expander will be separated from the tempering and moisture control assembly. Thus, referring back to FIG. 1, if the dot-dash line is taken to be the fire wall 110, the compressor-expander may be considered to be mounted in the engine space 111 while the tempering unit is in the passenger compartment 112. The inlet air may be guided to the inlet port 31 by an inlet duct 113 having branches 114, 115 for taking in "outside" air and "inside" air respectively, with the proportion being susceptible to adjustment by a swingable vane 116.

The present invention constitutes an economical solution to the problem of "harnessing" the compressor-expander, permitting it to work efficiently at a high differential temperature, between input and output, while yet insuring that the air which is produced is in a relatively dry state and at a comfortable temperature, either with the assistance of an auxiliary blower illustrated in the embodiments of FIGS. 1 and 5 or without, as illustrated in FIG. 10. At the same time a high degree of acoustic management is provided at low cost making it unnecessary to use any elaborate insulation or muffling.

As stated, it is one of the features of the construction described above, utilizing a porous filter, that it is self-correcting in the event that the pores tend to become clogged. However, it is conceivable that extreme conditions may be encountered in which the rate of build up of ice particles might, temporarily, exceed the system's capability of disposing of them. Where such conditions are anticipated a source of additional heat may be provided for the filter which is turned on when back pressure exceeds a predetermined level. Thus referring to FIG. 5, an auxiliary circuit 120 is provided having leads 121, 122 which are connected to the ends of the conductive filter element. Included in the circuit is a battery or other source of current 123 and an on-off switch 124. The switch is turned on by expansion of a bellows 125 which has a pneumatic connection 126 to the interior of the filter element 43a.

Consequently, upon excess build up of ice resulting in back pressure, the expansion of the bellows closes the switch 124 so that current flows through the heating element to temporarily assist in the melting of the ice. The resulting reduction in back pressure serves to turn off the switch. It will be apparent that instead of passing current directly through the filter element, the filter may be provided with heating wires (not shown) with the respective ends thereof connected to the leads 121, 122.

The term "ambient" as used herein is employed in a general sense to include the air in the conditioned space as well as the outside air. The heat exchanger 35 shown in FIGS. 1 and 10 is invariably coupled to the outside air.

I claim as my invention:

1. In an air conditioning system for use in a warm ambient, the combination comprising a compressor-expander having an output port for producing a stream of supercooled air having finely divided ice particles entrained therein, means coupled to the output port and defining a vent, a filter element interposed in the stream between the output port and the vent and of such mesh as to collect substantially all of the ice particles while allowing the cold dry air to pass through to the vent, thermal transmission means coupled to the ambient for transmitting heat therefrom to the filter to melt the ice particles collected therein, means for draining from the filter the collected moisture, and means associated with the vent for mixing the cold dry air in predetermined proportion with ambient air to form a tempered mix which is discharged from the vent.

2. In an air conditioning system for use in a warm ambient, the combination comprising a compressor-expander having an output port for producing a stream of supercooled air having finely divided ice particles entrained therein, means coupled to the output port and defining a vent, a filter element interposed in the stream between the output port and vent, the filter element being in the form of a layer of thermally conductive material having fine pores extending therethrough to collect substantially all of the ice particles while allowing passage of cold air to the vent, thermal transmission means coupled to the ambient for transmitting heat therefrom to the conductive filter to melt the ice particles collected therein, and means for draining from the filter the collected moisture.

3. In an air conditioning system for use in a warm ambient, the combination comprising a compressor-expander having an output port producing a stream of supercooled air having finely divided ice particles entrained therein, means coupled to the output port and defining a vent, a filter element interposed in the stream between the output port and the vent, the filter element being in the form of a layer of sintered metal having pores extending therethrough for collecting substantially all of the ice particles while allowing passage of cold dry air to the vent, thermal transmission means coupled to the ambient for transmitting heat therefrom to the filter to raise the temperature of the latter to a point above freezing thereby to melt the ice particles collected therein while at the same time reducing the temperature of the ambient, and means for draining from the filter the collected moisture.

4. In an air conditioning system for use in a warm ambient, the combination comprising a compressor-expander having an output port for producing a stream of supercooled air having finely divided ice particles entrained therein, means coupled to the output port for defining a vent, a hollow porous filtering element of thermally conductive material interposed in the stream between the output port and the vent for allowing passage of cool relatively dry air from the surface of the filtering element while collecting the entrained ice particles, means including a fan associated with the vent for directing ambient air onto the downstream side of the filtering element for warming the surface of the element to convert the ice particles to liquid moisture and for mixing of the ambient air thus directed with the cool dry air in predetermined proportion to form a tempered mix which is discharged from the vent, and means for draining the liquid moisture from the filter.

5. In an air conditioning system for use in a warm ambient, the combination comprising a compressor-expander having an output port producing a stream of supercooled air having finely divided ice particles entrained therein, a porous filter element connected to the output port and of such mesh as to pass cold dry air while collecting the particles in the stream, a plenum enclosing the filter, the plenum having an inlet opening for ambient air and having a vent, and means including a fan for drawing ambient air into the inlet opening and onto the filter for conveying heat to the filter sufficiently to melt any ice particles thereon and for mixing with the cold dry air from the filter so that a tempered mix is discharged through the vent.

6. In an air conditioning system for use in a warm ambient, the combination comprising a compressor-expander having an output port for producing a stream of supercooled air having finely divided ice particles entrained therein, a filter element connected to the outlet port, said filter element having walls formed of porous thermally conductive metal to pass cold dry air while trapping the ice particles, a plenum surrounding the filter element, the plenum having an inlet opening and a vent, means including a fan for drawing ambient air through the inlet opening into the plenum, the filter element being so located with respect to the inlet opening that a portion of the ambient air passes adjacent the filter element to maintain the temperature thereof above the freezing point so that the ice particles are converted to liquid moisture and so that the ambient air is mixed with the cold dry air from the filter to form a tempered mix which passes through the vent, and means for draining the collected moisture from the filter.

7. In an air conditioning system for use in a warm ambient, the combination comprising a compressor-expander having an output port producing a stream of supercooled air having finely divided ice particles entrained therein, a filter element in the form of a porous enclosure connected to the output port, a plenum surrounding the filter element and having an inlet opening and a vent, means including a fan for drawing ambient air into the inlet opening for warming the filter and for mixing with the cold air discharged from the filter to provide a tempered mix which is discharged through the vent, the filter being formed by a layer of porous metal having pores within the range of 0.5 and 1000 microns and the inside of the plenum being surfaced with acoustic insulating material so as to absorb any sonic pulsations emanating at the output port of the compressor-expander.

8. The combination as claimed in claim 7 in which an adjustable by-pass is providing for bypassing a portion of the air from the output port of the compressor-expander into the plenum thereby to control the moisture content of the tempered mix.

9. In an air conditioning system for use in a warm ambient, the combination comprising a compressor-expander having an output port producing a stream of supercooled air having finely divided ice particles entrained therein, a filter in the form of a hollow cylinder having walls made of porous thermally conductive metal, means for coupling the filter to the output port, a plenum surrounding the filter and having an inlet opening and a vent, means including a fan for drawing ambient air through the inlet opening into the plenum for maintaining the filter element above the freezing temperature and for mixing with the cold dry air passing through the filter to form a tempered mix which is discharged through the vent, the filter having a by-pass port with means for adjustably covering the port so that a predetermined amount of moisture-laden air is passed into the plenum thereby to control the humidity of the mix discharged through the vent.

10. In an air conditioning system for use in a warm ambient, the combination comprising a compressor-expander having an output port producing a stream of supercooled air having finely divided ice particles entrained therein, a filter having a porous thermally conductive wall, a plenum surrounding the filter for receiving the air passing through the filter and having a vent opening, the filter having thermally conductive fins extending outwardly therefrom into the ambient air for conducting heat from the ambient air to the filter to melt any ice particles which may adhere to the inner wall of the filter thereby to maintain the porous openings free of ice, and means for draining moisture from the filter.

11. The combination as claimed in claim 10 in which the fins are in contact with the filter element and extend outwardly therefrom through the plenum and into the ambient region.

12. The combination as claimed in claim 10 in which the fins are in the form of a corrugated surface in which the valleys of the corrugations are in thermal contact with the wall of the filter element.

13. In an air conditioning system for use in a warm ambient, the combination comprising a compressor-expander having an inlet port and an adjacent outlet port, adjacent conduits connected to the respective ports, the outlet port having a moisture separator in the form of a filter formed of thermally conductive porous material having pores which are sufficiently fine so as to entrap ice particles entrained in supercooled air flowing from the output port, a thermal conductor interposed in the inlet conduit and extending into thermal engagement with the filter for conducting heat from the ambient air flowing through the inlet conduit to the filter for melting any entrained ice particles which might otherwise clog the filter, means for draining away from the filter the collected moisture, and means for venting the cold dry air which passes through the filter.

14. In an air conditioning system for use in a warm ambient, the combination comprising a compressor-expander having an input port and an output port, adjacently positioned input and output conduits respectively connected to the input and output ports, a filter element interposed in the output conduit, said filter element being in the form of an enclosure having a wall formed of porous thermally conductive material, the filter having a thermally conductive fin which extends from the surface of the filter and which is coupled to the ambient air flowing through the inlet conduit so that a portion of the heat in the ambient air is thermally conducted to the filter serving to raise the temperature of the filter to a point above the freezing point so that any entrained ice particles in the air from the output port and striking the inner wall of the filter are melted to prevent clogging of the pores with ice particles, means for draining any moisture collected in the filter, and a vent at the end of the output conduit for venting the air which passes through the filter.

15. The combination as claimed in claim 14 in which means are provided for dividing the inlet conduit into two channels only one of which is thermally coupled to the filter element and including means for proportioning the air between the two channels.

16. The combination as claimed in claim 14 in which means are provided at the vent for mixing ambient air with the cold dry air to produce a tempered mix discharged from the vent.

17. The combination as claimed in claim 5 in which the filter includes an electrical heating element and in which means are provided for energizing the heating element coincidentally with a build up in back pressure within the filter element so that the heating element assists in the melting of collected ice particles.

* * * * *